April 5, 1966 W. R. ULLRICH ETAL 3,243,892
FREEZE DRYING APPARATUS

Filed Feb. 24, 1964 4 Sheets-Sheet 3

INVENTORS:
William R. Ullrich
Wilburn E. Christison

By Keith D. Beecher
Attorney

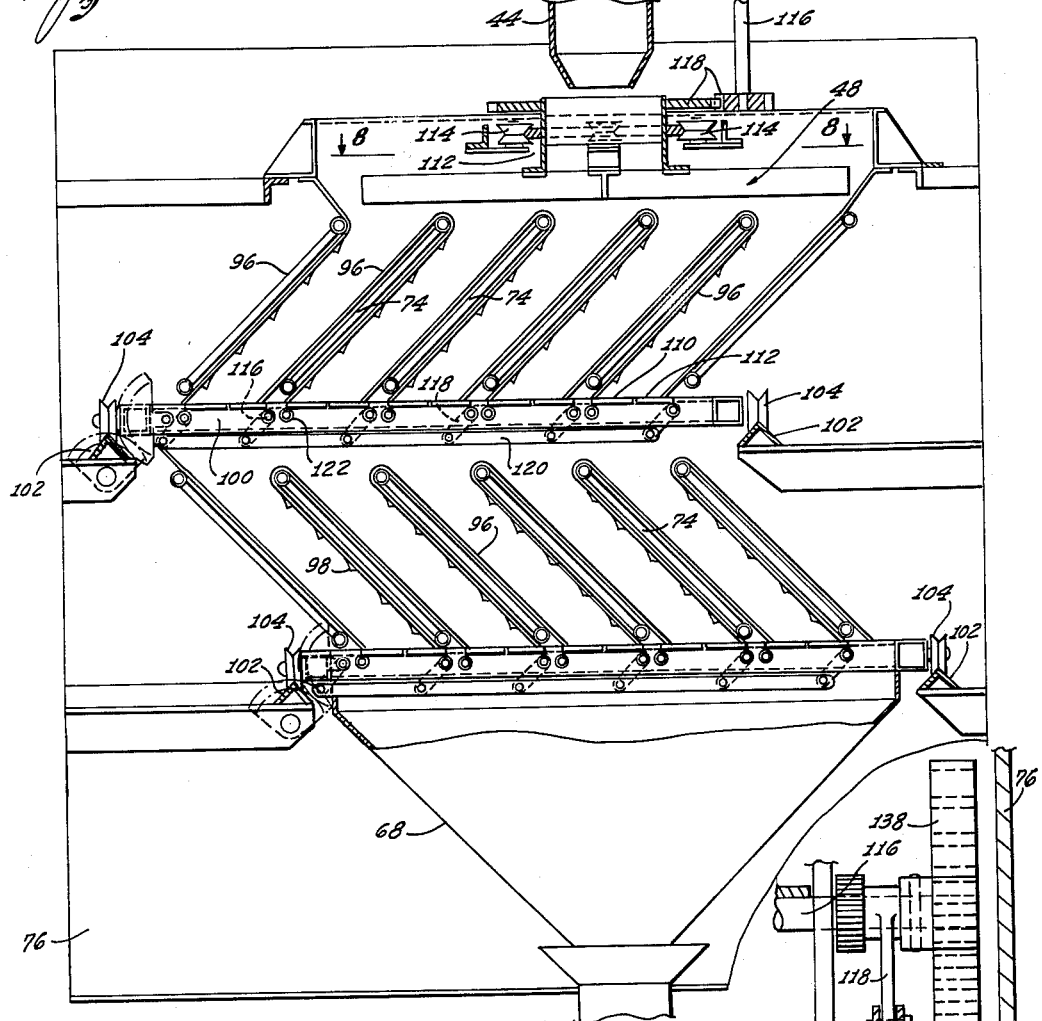
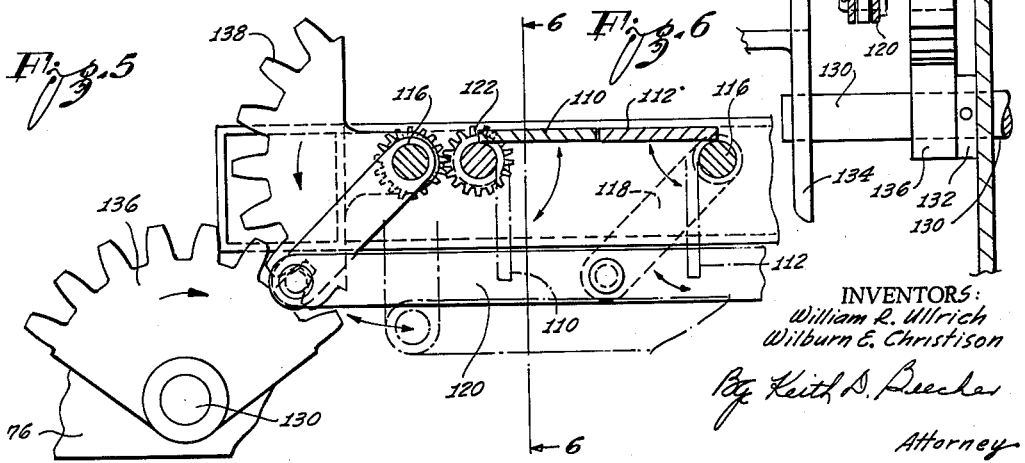

United States Patent Office 3,243,892
Patented Apr. 5, 1966

3,243,892
FREEZE DRYING APPARATUS
William R. Ullrich, North Hollywood, and Wilburn E. Christison, Los Angeles, Calif., assignors, by mesne assignments, to Beverly Refrigeration, Incorporated, Burbank, Calif., a corporation of California
Filed Feb. 24, 1964, Ser. No. 346,875
10 Claims. (Cl. 34—92)

The present invention relates to improved apparatus for drying a frozen product, such as food, in an evacuated drying chamber, whereby the ice in the produce is directly evaporated into a vapor state as the product is dried.

The preservation of a product by the freeze drying process is well known. This process involves the sublimation of ice out of the frozen product. Almost any food or beverage, cooked or uncooked, dried by the freeze drying method, can be preserved indefinitely without the need for refrigeration, bottles, or cans.

An advantage of the use of the freeze drying process is that food dehydrated by that process does not lose in color, taste, texture or nutritional content. Moreover, the dehydrated food is extremely light. The food may be reconstituted merely by immersing it in water.

Most of the prior art methods, other than freeze drying, for dehydrating foods include some inherent disadvantages. The freeze drying technique has been developed in an attempt to overcome the disadvantages of the other types of food preservation processes.

The freeze drying process, in brief, consists first in freezing the product to convert its water content into ice. The freezing is followed by the application of heat to the frozen product in an evacuated drying chamber. The pressure in the drying chamber is decreased to a level lower than the vapor pressure of the ice in the frozen product, at the particular temperature of the chamber.

This results in a sublimation of the ice in the product directly to the vapor phase. That is, the ice in the product is caused to change directly to vapor and to escape from the product without passing through a liquid phase. This elimination of the liquid phase in the treatment of the product means that there is no displacement of salts or other components of the product. Also, since the vapor itself has no disruptive power, changes in tissues of the product are avoided. It has been found that when treated by the freeze drying process, the product (such as food) retains all its original qualities and attributes.

As mentioned above, reconstitution of a product, treated by the aforementioned freeze drying process, can be achieved by immersing the product in water for a few minutes. This restores the product to its original state in all characteristics and qualities. The product, if a food, can then be prepared for eating in the usual manner, as mentioned above.

The usual prior art freeze drying apparatus is relatively complicated and expensive. This is due to the fact that difficult problems arise in the apparatus in providing for the removal in the evacuated drying chamber of the vapor generated by the product being treated, and at the same time to maintain the desired vacuum pressure in the chamber for the continued treatment of the product.

Other problems arise in attempting to establish the freeze drying process on a commercially practical, continuous basis; and to devise machinery capable of such continuous operation, this being due to the need of maintaining relatively low vacuum pressure at all times.

In fact, since the freeze drying process must be carried out under relatively low vacuum pressures, it was generally considered in the prior art that this ruled out a continuous process, and limited the freeze drying method to batch type operations. However, as will be described, the present invention provides an improved and commercially practical apparatus, which is capable of carrying out the freeze drying process on a continuous basis.

An object of the present invention, therefore, is to provide improved freeze-drying apparatus which is capable of freeze-drying foods, or the like, on a continuous basis in large quantities and at a relatively low cost.

Another object of the invention is to provide such improved apparatus which may be constructed to be relatively small in size and to be relatively low in cost.

Yet another object of the invention is to provide such improved apparatus which is relatively simple to operate, and which is easy to clean and maintain.

A feature of the invention is the provision of improved apparatus for carrying out the freeze-drying process, and which includes improved vacuum lock means for receiving the product into the drying chamber, and for providing a continuous flow of the product through the apparatus.

Another feature of the invention is the provision of apparatus in which a selective heat control may be imparted on the frozen product as it passes through the vacuum drying chamber of the apparatus. This is so that relatively high heat can be applied to the product without damaging the product at the early stages and when its ice content is relatively high, and so that a relatively low heat can be applied at the later stages when the ice content is relatively low. This means that the time of the drying cycle can be made relatively low, in that the maximum heat that can be withstood by the product without damage can be applied on an optimum basis at all times.

Yet another feature of the apparatus of the invention is the fact that it is conceived and constructed so that the product to be treated is handled in a gentle manner as it passes through the apparatus, so that fragile products may be handled by the apparatus without the possibility of breakage or damage.

In carrying out the usual freeze-drying process, the product being treated in the drying chamber is initially frozen prior to being introduced into the chamber, as mentioned above. However, this being the case, it is necessary under normal conditions for the pressure in the chamber to be maintained at a relatively low level. This is in order that the vacuum pressure in the chamber may be held below the vapor pressure of the ice in the product being treated. Although it is possible to maintain a sufficiently low pressure in the chamber for that purpose, this would normally require relatively large capacity vacuum pumps, and other devices which would render the over-all equipment practically infeasible from a commercial standpoint.

As an alternative, and as incorporated into the equipment of the present invention, a refrigerated surface is provided in a condensing chamber which, in turn, is in communication with the drying chamber; and this refrigerated surface serves to collapse and freeze the moisture vapor issuing from the frozen product. A vacuum pump is used to evacuate the drying and condensing chambers. This pump can have relatively low capacity since it merely serves to remove gases which are not capable of being condensed by the refrigerated surface, such gases being normally present in the food being treated or entering the drying chamber by leakage from the exterior. Also, the refrigerated surface in the condensing chamber prevents the vapors from reaching the intake of the pump.

The above-mentioned technique, as utilized in the apparatus of the present invention, of providing a condensing chamber for collapsing the condensable vapor from the treated product, and for thereby causing the condensable vapor immediately to return to its solid state, provides a system which is more economical to construct and easier to control, than a purely vacuum-type of freeze-drying system.

In order to maintain the desired vacuum within the drying chamber, without the need for vacuum pumps of excessively large size, it is essential for the condensable vapor in the drying chamber to pass immediately from its vapor state back to its solid state as it comes in contact with the aforementioned refrigerated surface in the condensing chamber. To accomplish this, the refrigerated surface must be maintained at a relatively low temperature. If such a temperature is maintained, substantially all the vapor issuing from the food being treated in the drying chamber passes immediately to the solid state as it comes in contact with the refrigerated surface, so that the vacuum in the drying chamber may be maintained by vacuum pumps of reasonable size.

In the past, the assembly referred to in the previous paragraph created problems in the provision of a structure capable of operation on a commercial basis. For example, as mentioned above, it was previously thought that the drying process could not possibly be continuous, but must be carried out on a batch basis. This was considered essential because the low pressure required in the vacuum drying chamber entailed the need for an absolutely vacuum-tight enclosure. The apparatus of the present invention solves this problem, as will be described, by the provision of relatively simple and easy to operate vacuum locks at the entrance and exit of the drying chamber.

Another problem militating against the use of continuous mechanisms in the prior art was the fact that ice forms on the refrigerated surface which must be periodically removed. This problem is solved in the apparatus to be described by providing the refrigerated surfaces in a condensing chamber separate from the actual drying chamber but coupled thereto, and by providing two or more of such condensing chambers.

Then, by the alternate use of the condensing chambers, one of the chambers can be undergoing a defrosting operation, while the other is providing a refrigerated surface for the drying process, and vice versa. This alternate use of the two condensing chambers can be carried out without disturbing the continuous operation of the drying process in the main drying chamber.

Other objects, advantages and features of the improved apparatus of the present invention will become apparent from a consideration of the following specification, when the specification is considered in conjunction with the accompanying drawings, in which:

FIGURE 4 is an enlarged fragmentary view, partly in section, illustrating certain components which are mounted in the interior of the aforementioned drying chamber;

FIGURE 5 is a fragmentary view, partly in section, illustrating a gate assembly included in the apparatus, and the actuating control means for the gate assembly;

FIGURE 6 is a view, substantially on the line 6—6 of FIGURE 5, of the mechanism shown in FIGURE 5;

FIGURE 7 is a detailed view of one of the components of the apparatus of FIGURES 1 and 2;

FIGURE 8 is a plan view of a spreader mechanism included in the unit, and taken substantially on the line 8—8 of FIGURE 4; and FIGURE 9 is a perspective view of a sheath member, a plurality of which are used in the apparatus to be described.

Figure 1:
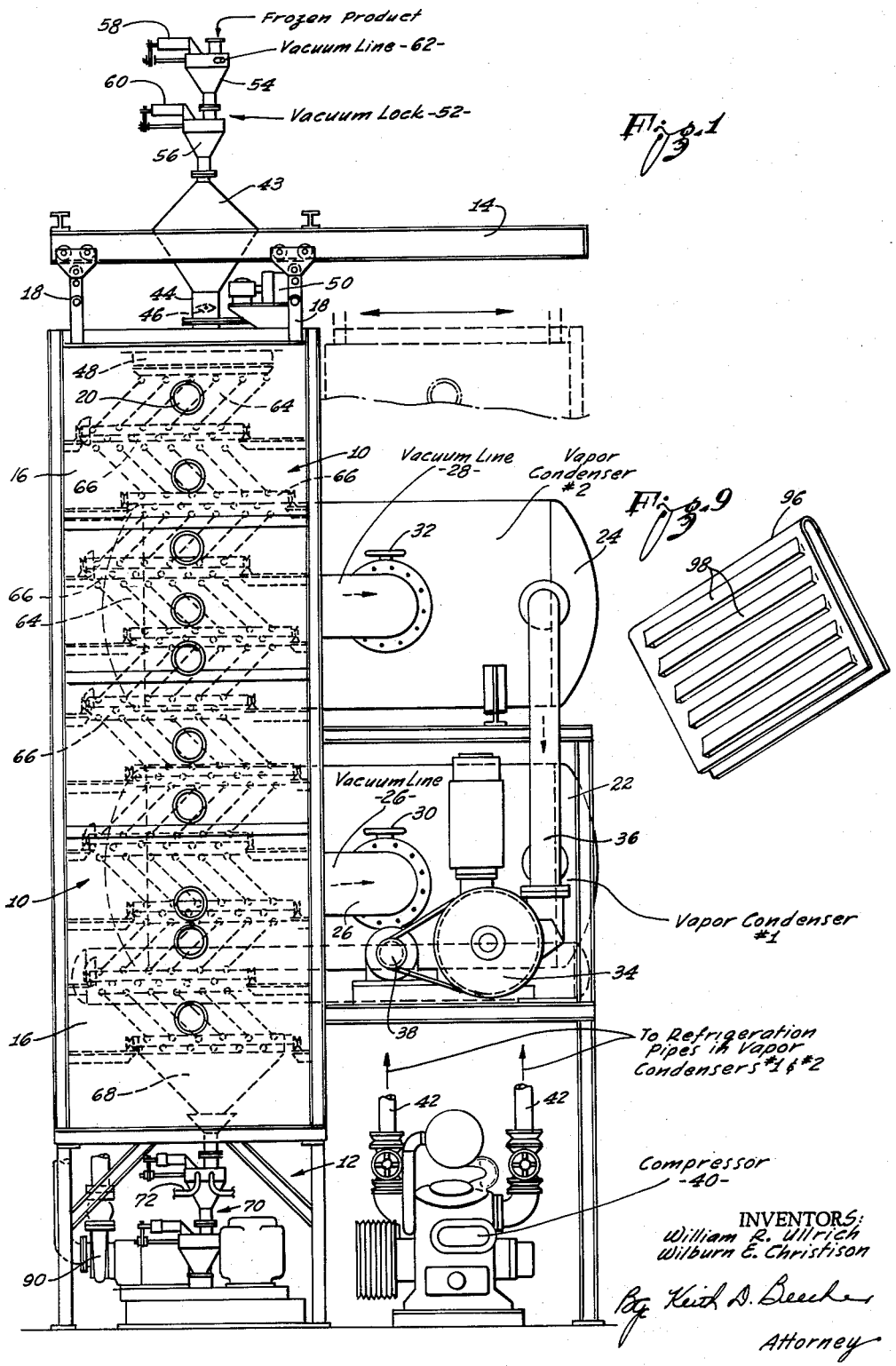
FIGURE 1 is a front elevational view of apparatus constructed in accordance with one embodiment of the invention.
Figure 2:
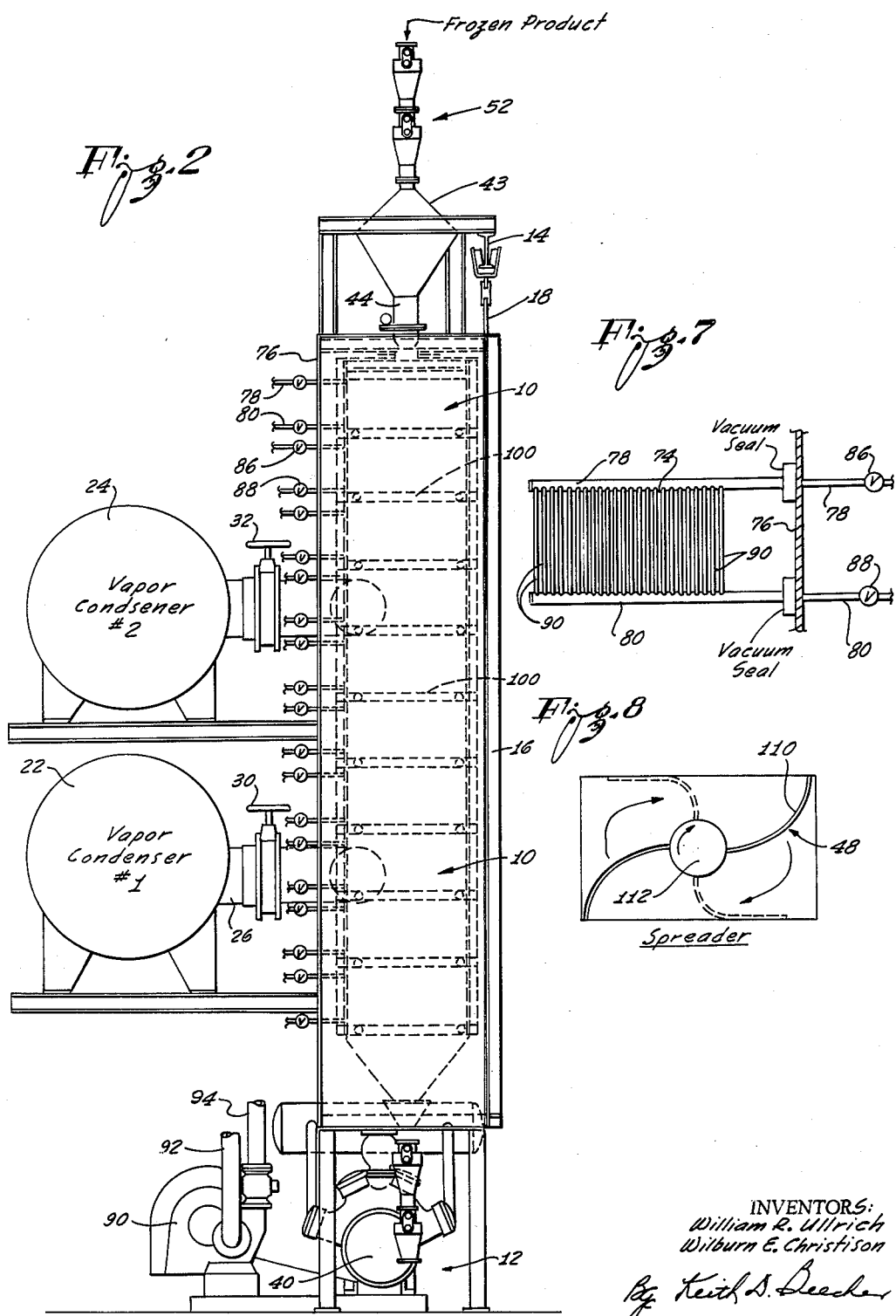
FIGURE 2 is a side elevational view of the apparatus of FIGURE 1.

The freeze-drying apparatus illustrated in the drawings includes a vacuum drying chamber 10. The drying chamber 10 is mounted in an upright manner on an appropriate supporting base structure 12, and it includes an entrance at the upper end thereof, and an exit at the lower end.

A track 14 is mounted adjacent the upper end of the drying chamber 10. The drying chamber includes a front door 16, and this door is suspended from the track 14 by a pair of trolleys 18. The door 16 is slidable between a closed and sealed position and an open position, by moving it along the track 14 on its trolleys 18. A plurality of view ports 20 are provided in the front door 16, so that the state of the product undergoing the drying process in the drying chamber 10 can be constantly under observation.

A pair of condenser chambers, designated "vapor condenser #" and "vapor condenser #2," respectively, and identified by the numerals 22 and 24, are coupled to the drying chamber 10 by means of appropriate pipelines 26 and 28. Manually operated valves 30 and 32 are provided in the respective lines.

The vapor condensers 26 and 28 are coupled to vacuum pump 34 by means of a common line 36 extending to the intake of the pump. The pump 34 is driven by an appropriate electric motor 38 by means of a usual belt drive. When the vacuum pump 34 is operated, it serves to evacuate the interior of the drying chamber 10, by withdrawing the gases in the chamber through the pipelines 26 and 28, and through the respective vapor condensers 22 and 24, and through the common pipeline 36 to the intake of the pump. The vapor condensers 22 and 24 are selectively utilized, by opening either one of the valves 30 and 32.

Usual refrigeration pipes are provided in the vapor condensers 22 and 24, and associated refrigeration systems are provided in the condensers for the corresponding pipes. The refrigeration systems are controlled by a compressor 40, and this compressor is coupled by pipelines 42 to the refrigeration systems in the vapor condensers.

The refrigeration systems in the respective vapor condensers are controlled, so that while one of the systems is undergoing a defrost cycle, the other is undergoing a refrigerating cycle, and vice versa. The vapor condenser undergoing the refrigerating cycle is coupled to the drying chamber by opening the corresponding valve 30 or 32. In this manner, continuous operation may be realized, merely by alternately using the vapor condenser 22, while the vapor condenser 24 is defrosting, and vice versa.

A main hopper 43 is provided at the entrance at the top of the drying chamber 10. This hopper extends into the interior of the drying chamber through a reduced throat section 44. A butterfly valve 46 is included in the throat section 44 to control the flow of the frozen product into the interior of the drying chamber.

A spreader assembly 48 is mounted at the top of the drying chamber adjacent the entrance thereof, and this spreader assembly is actuated by an electric drive motor 50. The spreader assembly 48 will be described in more detail in conjunction with FIGURES 4 and 8.

The main hopper 43 is coupled to the external atmosphere through a vacuum lock 52. The vacuum lock 52, as will be described in more detail in conjunction with FIGURE 3, includes a first chamber 54 and a second chamber 56. A valve assembly, to be described, is provided in each of the chambers. The valve assembly in the chamber 54 is controlled by an air cylinder actuator 58 of usual construction, and the valve assembly in the chamber 56 is controlled by an air cylinder actuator 60 of usual construction. A vacuum line 62 is coupled into the interior of the chamber 54.

In the operation of the apparatus, the frozen product is introduced down into the chamber 54, under conditions whereby the valve in the chamber 54 is open, and the valve in the chamber 56 is closed. After the chamber 54 has been filled with the product, its valve is closed, and the chamber is evacuated. Then, the valve in the chamber 56 is opened, permitting the product to fall into the chamber 56, and through that chamber into the hopper 43.

The valve in the chamber 56 is then closed, the valve in the chamber 54 is then opened, and the operation is repeated. In this way, the product can be fed on a more or less continuous basis into the hopper 43, providing for the continuous flow of the product into the evacuated drying chamber 10 from the hopper and under the control of the butterfly valve 46. The butterfly valve, of course, can be actuated by any appropriate automatic or manually controlled mechanism.

Disposed within the drying chamber 10 are a plurality of groups of platens, the groups being designated as 64. These groups are disposed one above the other in the drying chamber. The platens in the groups 64 are inclined in opposite directions, and they serve to transport the product by gravity from the top to the bottom of the drying chamber. The inclination of the platens in the groups 64 permits the product to fall gently from one group to the next.

A gate assembly 66 (to be described) is interposed between each of the groups 64. The gate assemblies may be individually controlled, and may be actuated between an open and a closed condition, so as to permit the product to fall from one group 64 to the next lower group of platens. In each instance, the product may be held in any group 64 by maintaining the corresponding gates closed; until it reaches a desired state of sublimation, and then it is dropped to the next group by opening the gates.

As the product leaves the lowermost group 64 of the inclined platens, it is received by an exit hopper 68. The exit hopper 68 feeds the product through a vacuum lock 70, which may be similar to the vacuum lock 52 described above. This permits the dried product to be fed out of the evacuated drying chamber 10. A nitrogen line 72 feeds nitrogen into the uppermost compartment of the vacuum lock 70, so as to preserve the product, and to prevent contamination thereof.

As shown in FIGURE 7, each platen in each group 64 may be composed of a tubular platen unit 74. Each of the units 74 is supported by the rear wall 76 of the drying chamber 10, and each unit extends into the drying chamber.

The platen unit 74 includes a pair of tubular side members 78 and 80 which extend through the rear wall 76 of the drying chamber 10 to the exterior of the drying chamber. Appropriate vacuum seals 82 and 84 are provided to maintain the vacuum tight conditions of the drying chamber. Independent valves 86 and 88 are provided externally of the chamber in the respective lines 78 and 80, so as to control the flow of hot fluid, such as oil or brine, through the lines. The hot fluid flowing through the lines 78 and 80 flows into the platen 74, and through a plurality of interconnecting tubular members 90 which extend between the side pipelines 78 and 80. Therefore, the platen member 74 may be raised to a selected elevated temperature, by controlling the flow of hot fluid through the pipelines 78 and 80, under the control of the valves 86 and 88.

The valves 86 and 88 may be automatically controlled, or they may be manually controlled. The control may be such that a different flow of hot fluid passes through each of the groups 64 of platens. The hot fluid is pumped through the platens by means of a circulating pump 90. The circulating pump is coupled to pipelines 92 and 94 which, in turn, are respectively coupled through common headers to the pipelines 78 and 80. By the appropriate control of the hot fluid passing through the different groups of platens, by the adjustment of the valves 86 and 88, a desired temperature gradient may be maintained down through the drying chamber 10.

For example, the temperature at the top of the chamber, and in the first group 64 of the platens, may be maintained at a temperature of the order, for example, of 280–300° F. for a selected product. Then, by selectively decreasing the flow of the hot fluid through successive ones of the platens, or by other control means, the temperature may be gradually reduced, from the top to the bottom of the drying chamber 10.

This temperature reduction provides for an optimum speed in the treatment of the product, without damage to the product. For example, when the product is first introduced into the drying chamber 10, it contains a relatively high amount of ice, so that it can be subjected to a relatively high temperature without damage. However, as the product falls towards the bottom of the chamber, more and more of the ice in the product has been removed, so that the temperature should be correspondingly reduced. This, as mentioned above, may be effectuated by the appropriate control of the valves 86 and 88, associated with the headers of the various banks of platens 74.

As shown in FIGURE 9, a U-shaped sheath 96 is provided for each platen 74, and this sheath is suspended over the respective platens. This sheath provides a smooth upper surface for supporting the product, as it slides down the inclined platen surface in each of the groups 64. However, the lower surface of the sheath may include a plurality of louvers 98, to provide for a smoother flow of heat from the tubular members of the platens 74 into the interior of the drying chamber 10.

It will be appreciated that since the platens 74 are all supported upon the rear wall 76 of the drying chamber 10, the opening of the front door 16 is unimpeded by the platens 74. When the front door is opened, the various sheaths 96 can be removed for steam cleaning purposes.

The construction of the platens is shown in more detail in the enlarged fragmentary view of FIGURE 4. The view of FIGURE 4 illustrates the top and lower groups 64 of the platens. As illustrated in FIGURE 4, the throat 44 of the hopper 43 introduces the product through the spreader 48 to the top group 64 of the platens. The apparatus includes a plurality of gate assemblies 100 which are respectively interposed between successive groups 64 of the platens. The gate assemblies are each mounted on tracks 102 by means of appropriate rollers 104. This enables the gate assemblies to be moved out from the chamber 10 for cleaning purposes, when the front door 16 is opened.

As the product is fed into the apparatus illustrated herein, the uppermost gate assembly 100 is closed, to permit the product to flow down in the spaces between the adjacent inclined smooth surfaces of the sheaths 96 of the uppermost group 64 of the platens. The spreader 48 is rotated, so that the product may be spread evenly into the spaces between the platens. The hot fluid flowing through the platens 74 causes the initial sublimation of the ice in the product, and after a predetermined time, the gates 100 at the lower end of the uppermost group 64 of platens are opened. This permits the product to flow down to the second group 64 of platens. There, as mentioned above, the product is further sublimated, but at a reduced temperature.

The aforementioned flow of the product continues from platen group 64 to platen group 64, until it reaches the lowermost group 64. The opening of the gates 100 at the bottom of the lowermost group 64, permits the product to flow into the exit hopper 68, so that it can be discharged from the drying chamber.

The spreader 48, as shown in FIGURE 8, may comprise a series of radial, flexible paddle-shaped arms 110 which are mounted on a central hub 112. The hub 112 is rotatably mounted in a plurality of rollers 114 which, in turn, are supported in the chamber 10. Rotational motion for the hub 112 from the drive motor 50 of FIGURE 1 is imparted through a drive shaft 116, and through a gear train 118.

As mentioned above, the gate assemblies 100 between the platen groups 64 may be independently operated. Each of these gate assemblies includes a pair of gate members 110 and 112, movable from a closed condition, as shown in FIGURE 4, to an open condition. When the gates are moved to the open condition, the gates 110 are rotated in a clockwise direction in FIGURE 4, whereas the gates 112 are rotated in a counterclockwise direction.

The gates 112 are mounted on corresponding shafts 116 which extend along the length of the gates, and corresponding cranks 118 are affixed to the shafts, adjacent the rear wall 76 of the drying chamber. A common rod 120 is coupled to the cranks 118, and the rod 120 is movable reciprocally to the left and right in FIGURE 4.

When the rod 120 is moved to the right in FIGURE 4, the gates 112 are moved angularly down in a counter-clockwise direction from the closed to the open direction. Conversely, when the link 120 is moved to the left in FIGURE 4, the gates 112 are closed.

The gates 110 are mounted on respective shafts 122, and these latter shafts are coupled through corresponding spur gears 124 to the shafts 116. Therefore, when the shafts 116 are moved in a counterclockwise direction, the shafts 122 are caused to move in a clockwise direction, and vice versa. This provides for both the gates 110 and 112 being actuated together from an open to a closed condition, as the rod 120 moves from the right to the left in FIGURES 4 and 5, and vice versa.

As best shown in FIGURE 6, the gates of any particular gate assembly 100 may be controlled by a shaft 130 extending through the rear wall of the drying chamber 76, and through a vacuum seal 132. It will be appreciated that a separate drive shaft 130 is provided for each gate assembly 100, and that these may be individually controlled.

The shaft 130 is supported between the rear wall 76 and a bracket 134. A gear segment 136 on the shaft 130 is coupled to a further gear segment 138 on the end shaft 116 of the corresponding gate assembly.

It will be understood that rotation of the gear segment 136 in a clockwise direction in FIGURE 5 produces a corresponding rotation of the gear segment 138, and of the corresponding shaft 116, in a counterclockwise direction. This, in turn, produces a movement of the rod 120 to the right in FIGURE 5, so that all the shafts 116 are moved in a counterclockwise direction, and all the corresponding shafts 122 are moved in a counterclockwise direction. This causes the gates 110 and 112 to open. It is also evident that rotation of the shaft 130 in the opposite direction causes the gates to close.

Figure 3:
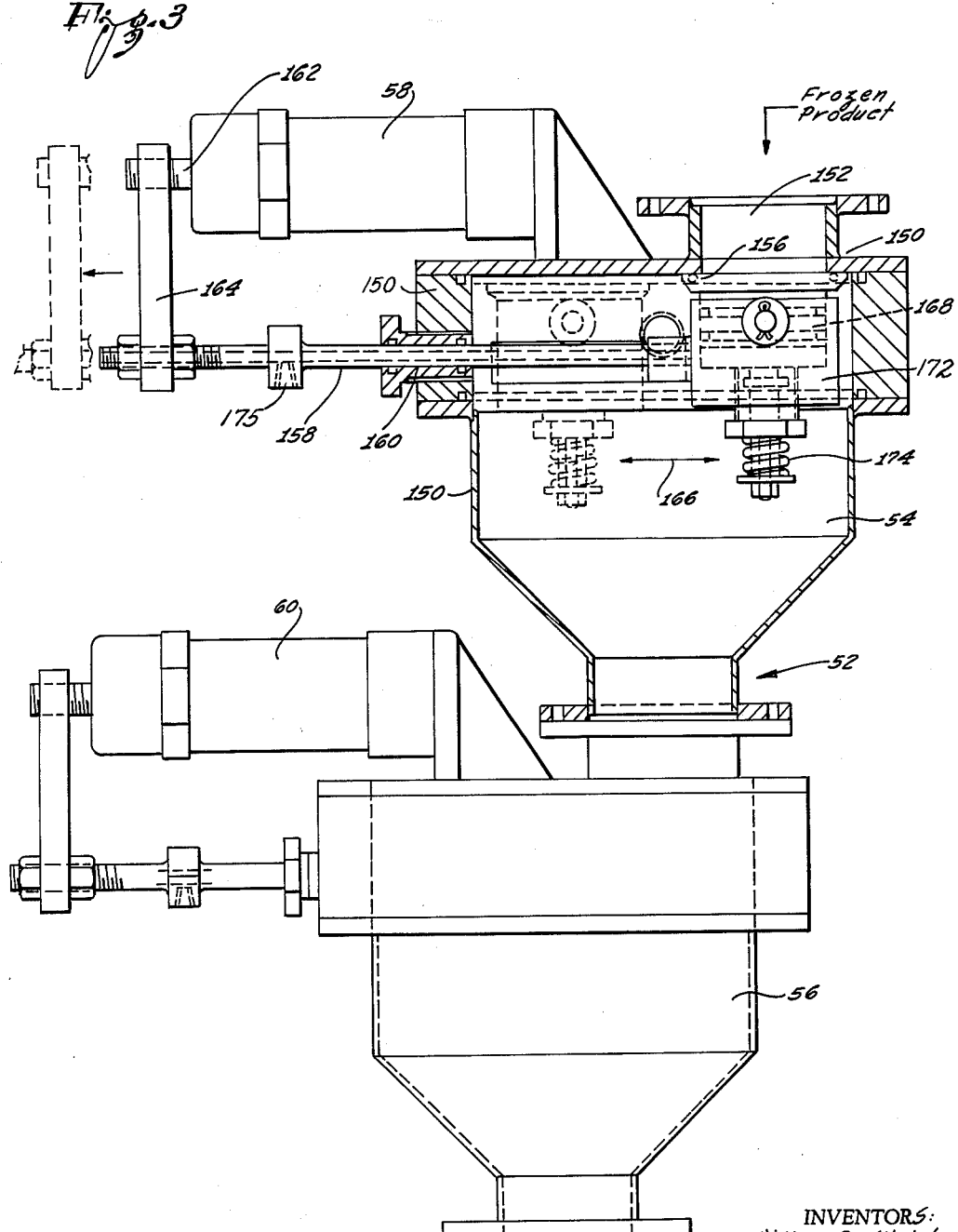
FIGURE 3 is an enlarged elevational view, partly in section, of a vacuum lock construction which is used at the entrance and exit to the drying chamber of the apparatus of FIGURE 1.

The details of the vacuum lock 52 are shown in FIGURE 3. The vacuum lock 70 may be similarly constructed. The chamber 54 of the vacuum lock 52 is shown in section, so as to reveal the inner components. It will be appreciated, of course, that the vacuum chamber 56 may have similar internal components to those shown in FIGURE 3.

The vacuum chamber 54 includes an external casing 150 which defines a hopper for the product fed into the chamber. The upper portion of the casing 150 includes an inlet 152 which, for example, may be coupled to an appropriate feed line for the introduction of the frozen product into the compartment 50.

The casing 150 defines a valve seat at the lower end of the inlet 152, and an O-ring 156 may be provided, for example, for sealing purposes. A tubular shaft member 158 extends into the casing 150 through a vacuum seal 160. The tubular shaft 158 is movable to the right and to the left in FIGURE 3, under the control of the air cylinder 58. To this end, the shaft 158 is coupled to the plunger 162 to the air cylinder 58 by means of an appropriate linkage 164.

As is well known, the air cylinder 58, under the usual pneumatic control, may be actuated to move the shaft 158 to the right or to the left in FIGURE 3, as designated by the arrow 166. A valve member 168 is mounted on the end of the tubular shaft 158 in the vacuum chamber 54. The valve member 168 is movable between a position in which it is axially aligned with the valve seat defined by the O-ring 156, in a first position; and in which it is displaced to the left from the valve seat (as shown by the dotted representation in FIGURE 3) in a second position. When the valve member 168 is in its second position, the product can be introduced into the compartment 54, through the inlet 152.

The valve member 168 is mounted in a cylinder 172, the latter being mounted on the tubular shaft 158. The valve member 168 is movable vertically within the cylinder 172, and it is normally biased to a lower position by means of a coil spring 174. When the valve member 168 is in its lower position, it is displaced downwardly from the valve seat defined by the O-ring 156, so that the chamber 54 is in an unseated condition.

However, when pressurized fluid (such as compressed air) is introduced through a fitting 175 into the interior of the hollow shaft 154, this pressurized fluid is carried into the lower part of the cylinder 172, to overcome the force of the spring 174 and force the valve member 168 up against the valve seat, so as to seal the vacuum chamber 54.

By means of the valve mechanism illustrated in FIGURE 3, and as described above, the valve 168 may be first released from the valve seat, merely by interrupting the introduction of the pressurized fluid through the fitting 175. When the valve member is so relieved from the valve seat, it drops away from the O-ring 156 and it may be moved to the left in FIGURE 3, under the control of the air cylinder 58.

Conversely, to close the valve assembly, the air cylinder 58 may be first actuated to bring the valve member 168 into position directly under the valve seat, and then the pressurized fluid may be introduced into the fitting 175 so as to close the valve, and seal the compartment 54.

In the manner described above, the vacuum chamber 54 may be conveniently opened for the reception of the frozen product, but with a minimum of wear to the valve member, or to the O-ring 156 which normally seals the compartment, when the valve member is in its closed condition.

The invention provides, therefore, an improved apparatus for freeze drying products on a continuous and commercially practical basis.

It is apparent that although a particular embodiment of the apparatus has been shown and described, modifications may be made. The following claims are intended to cover the modifications which fall within the scope of the invention.

What is claimed is:

1. Freeze-drying apparatus for removing ice from a frozen product by sublimation including: an upright drying chamber having an entrance at the upper end thereof and having an exit at the lower end thereof, a plurality of groups of inclined platens mounted in said drying chamber, said groups being mounted in displaced positions in said drying chamber one above the other for transporting the product by gravity from said entrance to said exit in said drying chamber, said platens being inclined in opposite directions in successive ones of said groups, gate means interposed between each of said groups of platens for controlling the transportation of the product by said groups, control means for actuating said gate means, tubular means included in the platens of said groups, and pumping means for circulating hot fluid through said tubular means.

2. The freeze-drying apparatus defined in claim 1 and which includes a gate assembly interposed between each of said groups of platens for controlling the transportation of the product through said drying chamber, a plurality of pairs of tracks mounted in said drying chamber, and roller means coupled to respective ones of said gate assemblies for supporting the same on respective ones of said pairs of tracks.

3. Freeze-drying apparatus for removing ice from a frozen product by sublimation including: an upright drying chamber having an entrance at the upper end thereof and an exit at the lower end thereof, a plurality of groups of inclined platen units each including tubular means and mounted in said drying chamber for transporting the product by gravity through said chamber from said entrance to said exit of said chamber, said groups of platen units being mounted at spaced positions in said drying chamber one above the other and supported on the rear wall thereof, a corresponding plurality of removable sheaths supported over respective ones of said platen units, and pumping means for circulating hot fluid through said tubular means of said platen units.

4. The combination defined in claim 3 in which said sheaths each have a plurality of louvers formed in the lower surface thereof.

5. The combination defined in claim 8 and which includes track means supported at the upper end of said drying chamber, in which said drying chamber includes a movable front door, and which includes trolley means for suspending said door from said track means to permit said door to be opened and closed in a sliding relationship with said drying chamber.

6. Freeze-drying apparatus for removing ice from a frozen product by sublimation including: an upright drying chamber having an entrance at the upper end thereof and an exit at the lower end thereof, a condensing chamber communicating with said drying chamber and including means for condensing water vapor received from said drying chamber, evacuating pumping means coupled to said condensing chamber for evacuating said drying chamber and for circulating water vapor therein into said condensing chamber, a plurality of groups of inclined platens mounted in said drying chamber for transporting the product by gravity through said drying chamber from said entrance to said exit of said drying chamber, said groups of inclined platens being mounted in spaced positions in said drying chamber one above the other, and said platens being oppositely inclined in successive ones of said groups, tubular means included in the platens of said groups, pumping means for circulating hot fluid through said tubular means of said platens, gate means interposed between each of said groups of platens, control means for actuating said gate means between an open and a closed condition, first hopper means positioned at said entrance for feeding the product to the top group of said platens, first vacuum lock means coupling said first hopper means to the external atmosphere, second hopper means positioned adjacent said exit for receiving the dried product from the lower group of said platens, and second vacuum lock means for coupling said second hopper means to the external atmosphere.

7. The combination defined in claim 6 and which includes a spreader means disposed between said first hopper means and said top group of said platens.

8. A vacuum lock including: means defining a valve seat, a valve member, air cylinder control means for moving said valve member transversely with respect to the axis of said valve seat between a first position in axial alignment with said valve seat and a second open position displaced transversely from the axis of said valve seat to permit the passage of a product through the vacuum lock, spring means for biasing said valve member in one direction with respect to said valve seat when said valve member is in said first position, and means for introducing a fluid to said valve member to overcome the force of said spring means and bias said valve member in the other direction with respect to said valve seat when said valve member is in said first position so as to permit said vacuum lock to be opened and sealed when said valve member is in said first position.

9. A valve assembly including: a casing including means defining a valve seat, a valve member, tubular shaft means extending through said casing for supporting said valve member, said tubular shaft means being movable with respect to said casing for moving said valve member transversely with respect to the axis of said valve seat between a first position in axial alignment with said valve seat and a second open position displaced transversely from the axis of said valve seat, spring means coupled to said valve member and to said tubular shaft for biasing said valve member away from said valve seat when said valve member is in said first position, said tubular shaft providing a channel for introducing a fluid to said valve member to overcome the force of said spring means and bias said valve member against said valve seat when said valve member is in said first position to as to permit said vacuum lock to be sealed.

10. A valve assembly including: a casing including means defining a valve seat, a cylinder positioned in said casing and displaced from said valve seat, a valve member movable in said cylinder towards and away from said valve seat, tubular shaft means extending through said casing and into said cylinder for supporting said valve member and said cylinder, said tubular shaft means being movable with respect to said casing for moving said valve member and said cylinder transversely with respect to the axis of said valve seat between a first position in axial alignment with said value seat and a second open position displaced transversely from the axis of said valve seat, spring means coupled to said valve member and to said tubular shaft for biasing said valve member in said cylinder in one direction with respect to said valve seat when said valve member is in said first position, said tubular shaft providing a channel for introducing a fluid into said cylinder and to said valve member to overcome the force of said spring means and move said valve member in said cylinder in the opposite direction with respect to said valve seat when said valve member is in said first position, so as to permit said vacuum assembly to be opened and sealed when said valve member is in said first position.

References Cited by the Examiner

UNITED STATES PATENTS

| 239,057 | 3/1881 | Poore | 251—175 |
| 989,201 | 4/1911 | Snow | 251—158 |
| 1,056,860 | 3/1913 | Walker | 251—158 |
| 1,280,451 | 10/1918 | Hagen | 251—158 |
| 2,472,525 | 6/1949 | Edwards | 251—56 |
| 2,751,687 | 6/1956 | Colton | 34—92 |
| 2,858,096 | 10/1958 | Warren | 251—56 |
| 3,020,645 | 2/1962 | Copson | 34—5 |

FOREIGN PATENTS 12,764 AD1896 Great Britain.

WILLIAM J. WYE, *Primary Examiner.*